(12) United States Patent
Lusk

(10) Patent No.: US 6,629,815 B2
(45) Date of Patent: Oct. 7, 2003

(54) PERIPHERAL TURBINE SUPPORT SYSTEM

(76) Inventor: Dennis W. Lusk, 16540 Willow Glen Dr., Odessa, FL (US) 33556

( * ) Notice: Subject to any disclaimer, the term of this patent is extended or adjusted under 35 U.S.C. 154(b) by 149 days.

(21) Appl. No.: 09/682,272

(22) Filed: Aug. 13, 2001

(65) Prior Publication Data

US 2003/0030283 A1 Feb. 13, 2003

(51) Int. Cl.$^7$ ................................................. F03D 7/00
(52) U.S. Cl. ................. 415/4.002; 415/907; 416/244 R
(58) Field of Search .................... 415/4.2, 4.4, 907; 416/109, 108, 111, 116, 119, 244 A, 244 R

(56) References Cited

U.S. PATENT DOCUMENTS 4,571,152 A * 2/1986 Tatar ........................... 415/4.2

* cited by examiner

*Primary Examiner*—Edward K. Look
*Assistant Examiner*—Kimya N McCoy
(74) *Attorney, Agent, or Firm*—Anton J. Hopen; Smith & Hopen, P.A.

(57) ABSTRACT

A turbine apparatus for providing support peripherally for a turbine rotor having either a vertical or horizontal axis of rotation. The present invention includes a plurality of blades distributed about the rotor, the blades across their width being shaped and angularly pitched to the flow of air therebetween to effect rotation of the rotor and the blades defining a peripheral boundary of the rotor. A support system for the blades includes a support ring concentric with the turbine axis of rotation and adjacent to the peripheral boundary of the rotor. A support mechanism for each blade includes a support assembly mounted in rotational supporting association with the support ring so that the mass and forces generated by each blade is substantially supported at the peripheral boundary of the rotor by the support ring.

20 Claims, 15 Drawing Sheets

PERIPHERAL TURBINE SUPPORT SYSTEM

BACKGROUND OF INVENTION

1. Field of Invention

This invention relates to turbines, and more particularly to the support structure of turbines and translation of wind energy to useful mechanical and/or electrical energy.

2. Background of the Invention

Wind turbines are built to harness the wind's energy. A typical wind turbine system for an electricity generation application includes a rotor, i.e., blades, a tower that supports the rotor, a gearbox, a generator, and other equipment including controls, electrical cables, ground support equipment, and interconnection equipment. The rotor converts the energy in the wind to rotational shaft energy. There are two common groupings for wind turbines, the horizontal axis wind turbine (herein "HAWT") and the vertical axis wind turbine (herein "VAWT"). A wind turbine that has an axis of rotation vertical with respect to the ground and substantially perpendicular to the wind stream is a VAWT. The VAWT allows a generator and other associated relatively heavy equipment to be located on the ground and a tower may not be needed, thus reducing costs of construction. Also, a VAWT does not require a yaw mechanism to turn the rotor against the wind. However, because the VAWT is located near ground level, the wind speeds are typically lower and more turbulent thus reducing the efficiency of the wind turbine. To date, the only vertical axis turbine to be manufactured commercially with any success is the Darrieus machine that is characterized by its C-shaped rotor blades and similar in appearance to an "eggbeater." The more common wind turbine is the HAWT that incorporates a horizontal axis of rotation with respect to the ground and the axis of rotation is substantially parallel to the wind stream. The HAWT typically has a propeller like configuration with two or three narrow blades. As the wind passes over both surfaces of the blade, the wind passes more rapidly over the upper side of the blade creating a lower pressure and a resulting aerodynamic lift force. The lift force of the blade causes the blade to turn about the center of the turbine.

Turbines with many blades or very wide blades are considered as having a high "solidity," which is based on the amount of area the blades take up of the circle they define, i.e., swept area, while turning. This allows the blades to turn in low velocity winds. Although turbines with high solidity allow for maximum capture of the wind"s energy, a solid rotor is not capable of sustaining high winds. A wind turbines energy production potential can also be estimated by its rotor diameter that defines the swept area. Many features of a wind turbine"s design affect the energy output of a wind turbine. For example, the power the wind turbine produces at moderate wind speeds is largely determined by blade airfoil shape and geometry. Recent refinements in blade airfoil shapes have increased annual energy output from 10 to over 25 percent. Additionally, the operating characteristics of a wind turbine determine the turbine"s ability to produce power when the wind speeds are in its operating range. The efficiency of the generator and gear box also are significant factors in a wind turbine"s ability to produce power.

The power that can be extracted by a wind turbine is best characterized by the following wind turbine power equation: $P=(0.5)(\rho)(A)(C_p)(V^3)(N_g)(N_b)$ where: P=power (watts) $\rho$=air density (kg/m$^3$) A=rotor swept area (m$^2$) $C_p$=coefficient of performance V=wind velocity (m/sec) $N_g$=generator efficiency $N_b$=pearbox/bearings efficiency The air density of air at sea level is approximately 1.225 kg/m. The theoretical maximum is 0.59 for a coefficient of performance based on Betz" law for the aerodynamics of wind turbines. However a value of 0.35 is a more reasonable coefficient of performance for a good design. Thus, as can be deduced from the wind turbine power equation, an increase in the rotor swept area is directly proportional to the power that can be extracted from the wind turbine for a given wind velocity if all other variables remain substantially constant. Continuing efforts are being made to increase the size of rotor blades and consequently the rotor swept area. By way of example is the huge German Growian HAWT with a rotor diameter of 100 meters that was designed to deliver several megawatts of electricity. However, the Growian was ultimately a failed attempt to increase the size and capability of power generation of a wind turbine because the Growian wind turbine was taken out of service after less than three weeks of operation. The enormous stresses experienced by the rotor hub during its short operation revealed that the rotor hub was inadequately constructed and effectively irreparable.

Manufacturers generally build turbines with few, long, narrow blades that rotate relatively quickly. The blades are subject to repeated bending and vibration that can result in fatigue and failure of the rotor blades. Metal is known to be susceptible to fatigue and is generally not used as a material for large rotor blades. In addition, the tower supporting the rotor will oscillate back and forth based on the particular configuration of the wind turbine. The rotor blade may amplify the oscillations of the tower thus increasing the stress imposed on the wind turbine. Wind turbine manufacturers validate that their turbines can withstand extreme winds using computer models to simulate the structural dynamics of a wind turbine during high wind conditions. Wind turbines that utilize relatively large blades typically require the stiffness of the blades to be increased and the weight of the blades decreased. The upper limit size of large blades is constrained by the advances in rotor blade materials and the ability of the wind turbine to support the large blades and other components being subjected to extreme dynamic forces.

Accordingly, what is needed in the art is a wind turbine with an increased rotor diameter that overcomes the structural dynamic limitations of the prior art wind turbines and provides an improvement that is a significant contribution to the advancement of the wind turbine art.

It is, therefore, to the effective resolution of the aforementioned problems and shortcomings of the prior art that the present invention is directed.

However, in view of the prior art in at the time the present invention was made, it was not obvious to those of ordinary skill in the pertinent art how the identified needs could be fulfilled.

SUMMARY OF INVENTION

The longstanding but heretofore unfulfilled need for an improved apparatus for supporting turbines is now met. The new, useful, and nonobvious turbine support includes a rotor having a generally vertical axis of rotation, a plurality of blades distributed about the rotor, the blades across their width being shaped and angularly pitched to the flow of air therebetween to effect rotation of the rotor and the blades defining a peripheral boundary of the rotor, a support system for the blades including a single support ring concentric with the vertical axis of rotation and underlying the peripheral boundary of the rotor that utilizes a dual ring design, and a rolling assembly for each blade comprising an upper rolling assembly mounted in rotational supporting association with the support ring so that the mass and forces generated by each blade is substantially supported at the peripheral boundary of the rotor by an upper surface of the support ring.

Distributing the weight of the rotor blades to the periphery, as in the present invention, instead of concentrating the loads at a central axis allows for larger wind turbines that have higher power generation capability to be constructed. The present invention also provides for heavier construction materials to be used in the fabrication of the wind turbine. The peripheral support apparatus of the present invention is adaptable for use with prior art rotor blades and designs. In the following embodiments, rolling support assemblies and support mechanisms are described. Rolling assemblies and support mechanisms are hereby defined to include any means that is used to support the rotor blades including, but not limited to, any type of wheels, for example railroad type wheels or those found on modern day roller coasters. However, magnetic fields, compressed air or any other devices that provide a support means for the rotor blades at the periphery of the wind turbine also comes within the purview of rolling assemblies and support mechanisms of the present invention. The support rings herein described can be constructed by any conventional means.

In a first embodiment, a vertical axis turbine has one concentric ring that provides support for the vertical rotor blades as they rotate about a common center of the turbine. Each blade has a lower support mechanism affixed to the bearing end. As the wind rotates the blades about the common center of the turbine, the blades are constrained to follow the support ring via an upper rolling assembly of the support mechanism.

In a second embodiment, a vertical axis turbine is provided with a support mechanism that includes an upper rolling assembly that rides along the top surface of the support ring as in the first embodiment, but also includes a lower rolling assembly that rides along the bottom surface of the support ring, providing resistance of any uplift forces experienced by the blade.

In a third embodiment, a horizontal axis turbine has a concentric ring that provides support for the rotor blades as they rotate in propeller fashion. Each blade has a support mechanism affixed to the peripheral portion of the blade. As the wind rotates the blades in a perpendicular plane to the wind stream, the blades are constrained to follow the support ring via an inner rolling assembly of the support mechanism.

In a fourth embodiment, a horizontal axis turbine is provided with a support mechanism that includes an inner rolling assembly as in the third embodiment, but also includes an outer rolling assembly that rides along the outer surface of the support ring to provide additional stability.

In a fifth embodiment, a vertical axis turbine has inner and outer concentric rings that provide support for the vertical rotor blades as they rotate about a common center of the turbine. The rings are located approximately at the longitudinal center of the blades with the inner ring on the inner periphery and the outer ring on the outside periphery of the blades. Each blade has inner and outer rolling assemblies affixed to both the inner and outer periphery of the blades and located approximately at the longitudinal center of the blades to be in cooperative association with each respective ring. As the wind rotates the blades about the common center of the turbine, the blades are constrained to follow the support rings via upper rolling assemblies of the respective support mechanism.

In a sixth embodiment, a vertical axis turbine has inner and outer concentric rings that provide support for the vertical rotor blades as they rotate about a common center of the turbine as in the fifth embodiment. As the wind rotates the blades about the common center of the turbine, the blades are constrained to follow the support rings via upper rolling assemblies of the respective support mechanism as in the fifth embodiment, but also includes lower rolling assemblies that ride along the lower surface of the respective rings.

In a seventh embodiment, a vertical axis turbine has upper and lower concentric rings that provide support for the vertical rotor blades as they rotate about a common center of the turbine. Each blade has a support mechanism affixed to the bearing end. As the wind rotates the blades about the common center of the turbine, the blades are constrained to follow the lower support ring via an upper rolling assembly of a lower support mechanism as in the first embodiment, but also includes an upper support mechanism that constrains the upper nonbearing end of the blade to follow the upper support ring via a lower rolling assembly of an upper support mechanism.

In an eighth embodiment, a vertical axis turbine has upper and lower concentric rings that provide support as in the seventh embodiment, but includes a lower rolling assembly of the upper support mechanism that rides along the lower surface of the upper ring. The lower support mechanism also includes a lower rolling assembly that rides along the lower surface of the lower support ring.

In a ninth embodiment, a vertical axis turbine has one concentric ring that provides support for the vertical rotor blades as they rotate about a common center of the turbine. Each blade has an upper support mechanism affixed to the uppermost portion of the blade. As the wind rotates the blades about the common center of the turbine, the blades are constrained to follow the support ring via an upper rolling assembly of the support mechanism.

In a tenth embodiment, a vertical axis turbine has one concentric ring that provides support for the vertical rotor blades as they rotate about a common center of the turbine as in the ninth embodiment, but also includes a lower rolling assembly of the support mechanism that rides along the lower surface of the upper ring.

In an eleventh embodiment, a vertical axis turbine has one concentric ring that provides support for the vertical rotor blades as they rotate about a common center of the turbine. Each blade has a support mechanism affixed to the bearing end. As the wind rotates the blades about the common center of the turbine, the blades are constrained to follow the support ring via an upper rolling assembly of the support mechanism. This embodiment does not have a center shaft for power take-off. Thus, alternative methods that can use the rotation of the rolling assemblies to provide power generation are employed.

In a twelfth embodiment, a vertical axis turbine is provided with a support mechanism that includes an upper rolling assembly that rides along the top surface of the support ring as in the eleventh embodiment, but also includes a lower rolling assembly that rides along the bottom surface of the support ring, providing resistance of any uplift forces experienced by the blade. This embodiment, as in the eleventh embodiment, does not have a center shaft for power takeoff and employs alternative power generation means.

A primary object of the invention is to provide a support means for a wind turbine that distributes the stresses of the rotor blades to the periphery of the wind turbine.

Another very important object is to provide a turbine support that may be fabricated of relatively inexpensive materials and with simple engineering design without sacrificing efficiency.

Still another important object is to provide a turbine support that provides a more stable design, resulting in longer lasting and less costly wind turbines.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF DRAWINGS

For a fuller understanding of the nature and objects of the invention, reference should be made to the following detailed description, taken in connection with the accompanying drawings, in which.

DETAILED DESCRIPTION

Figure 1:
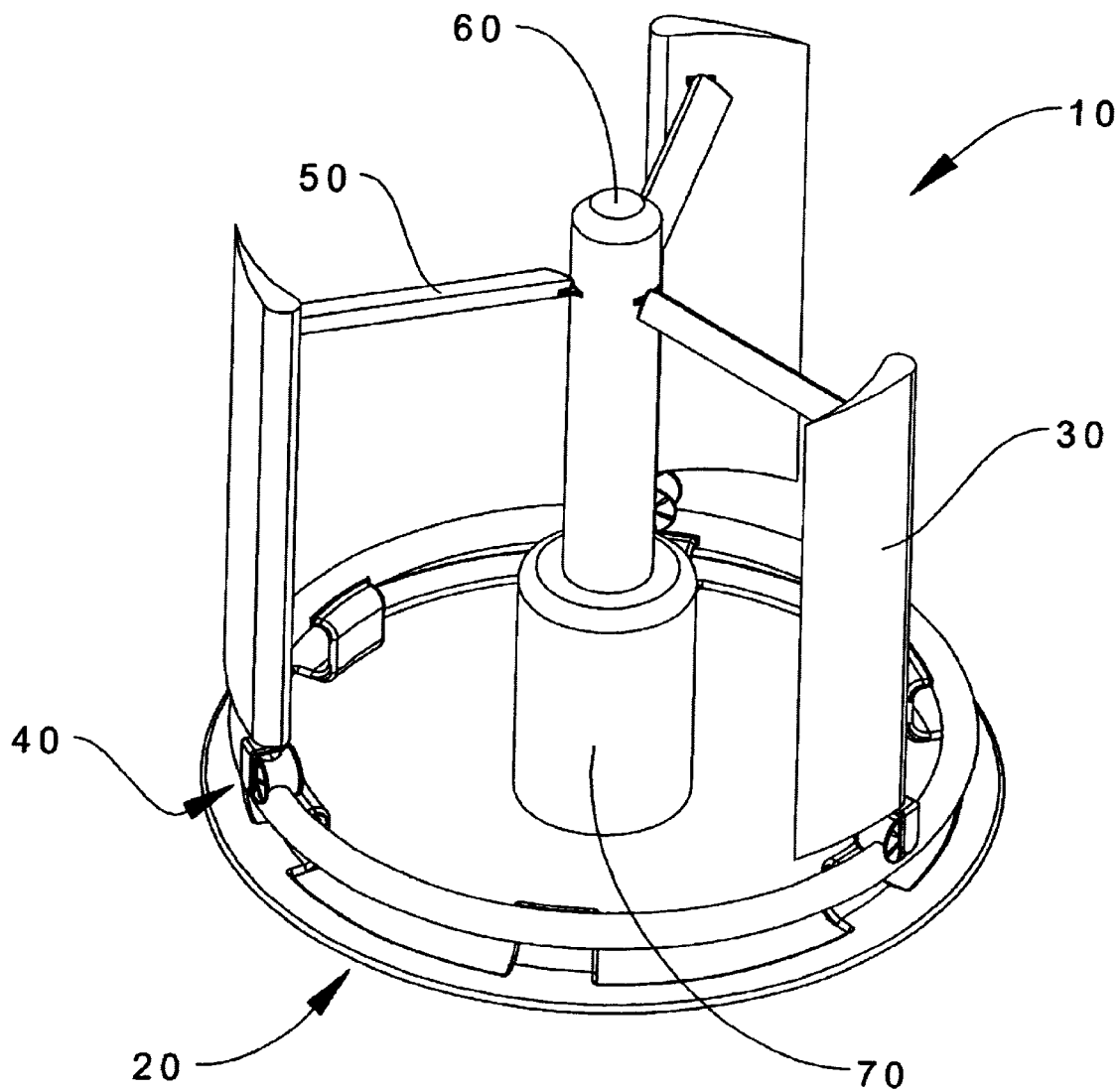
FIG. 1 is a perspective view of a first embodiment in accordance with the present invention.
Figure 2:
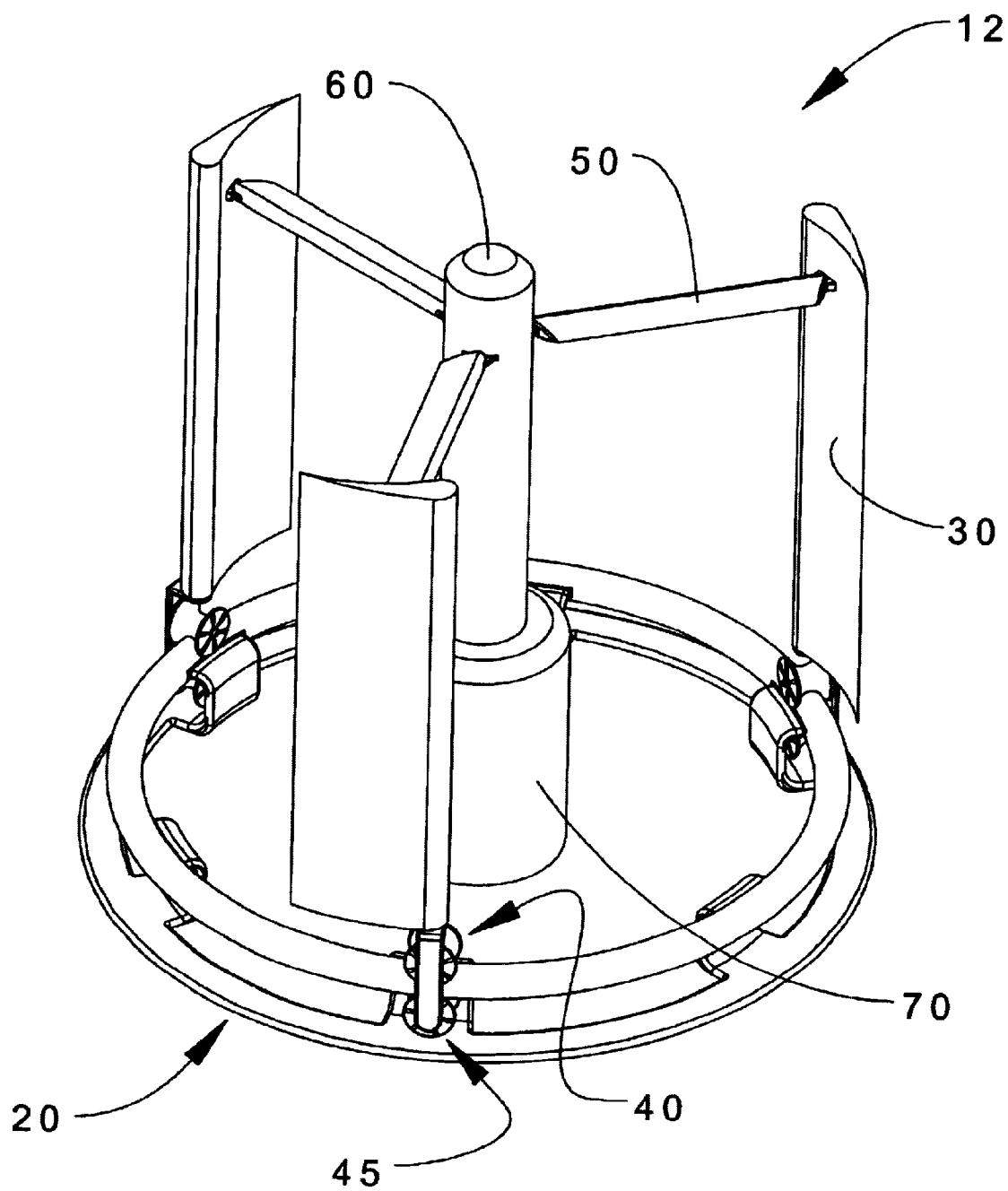
FIG. 2 is a perspective view of a second embodiment in accordance with the present invention.

FIG. 1 shows the first embodiment of a VAWT generally denoted 10. Rotor blades 30 are supported by a single support ring 20 which utilizes a dual ring configuration of a rounded, upper ring and a flattened, lower ring 20. The upper rolling assembly 40 of the lower support mechanism is mounted to blade 30. Rolling assembly 40 bears the weight of blade 30, thus no weight is supported by center shaft 60. Blade 30 rotates in response to a wind force following the ring 20 in an annular path. As blades 30 rotate, the rotational energy is transferred to center shaft 60 by radial arms 50. The rotational force is converted to electrical energy via generator means 70. FIG. 2 shows a second embodiment of a VAWT generally denoted 11, and is similar to first embodiment, but includes another rolling assembly 45. Lower rolling assembly 45 serves to further stabilize wind turbine 12.

Figure 3:
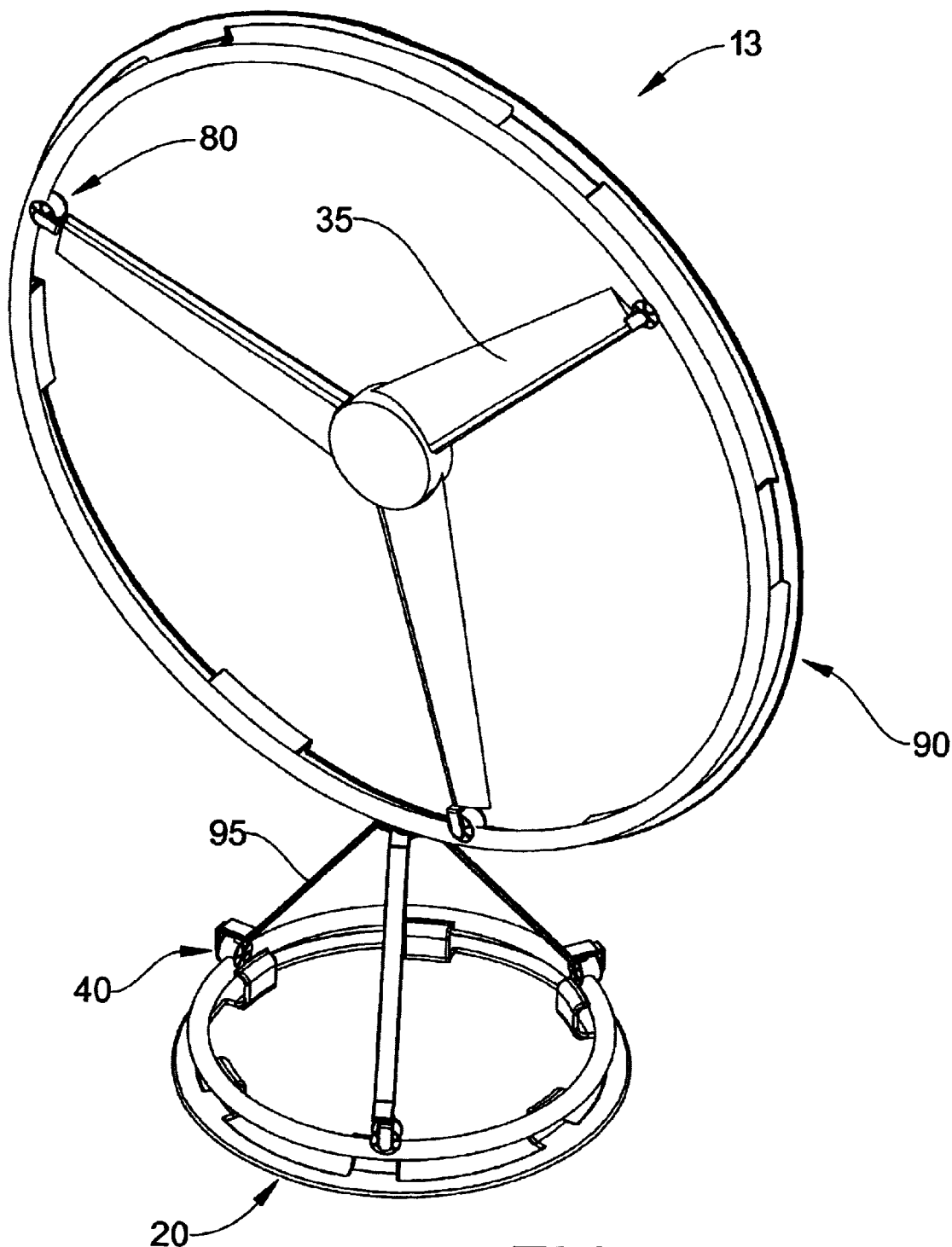
FIG. 3 is a perspective view of a third embodiment in accordance with the present invention.
Figure 4:
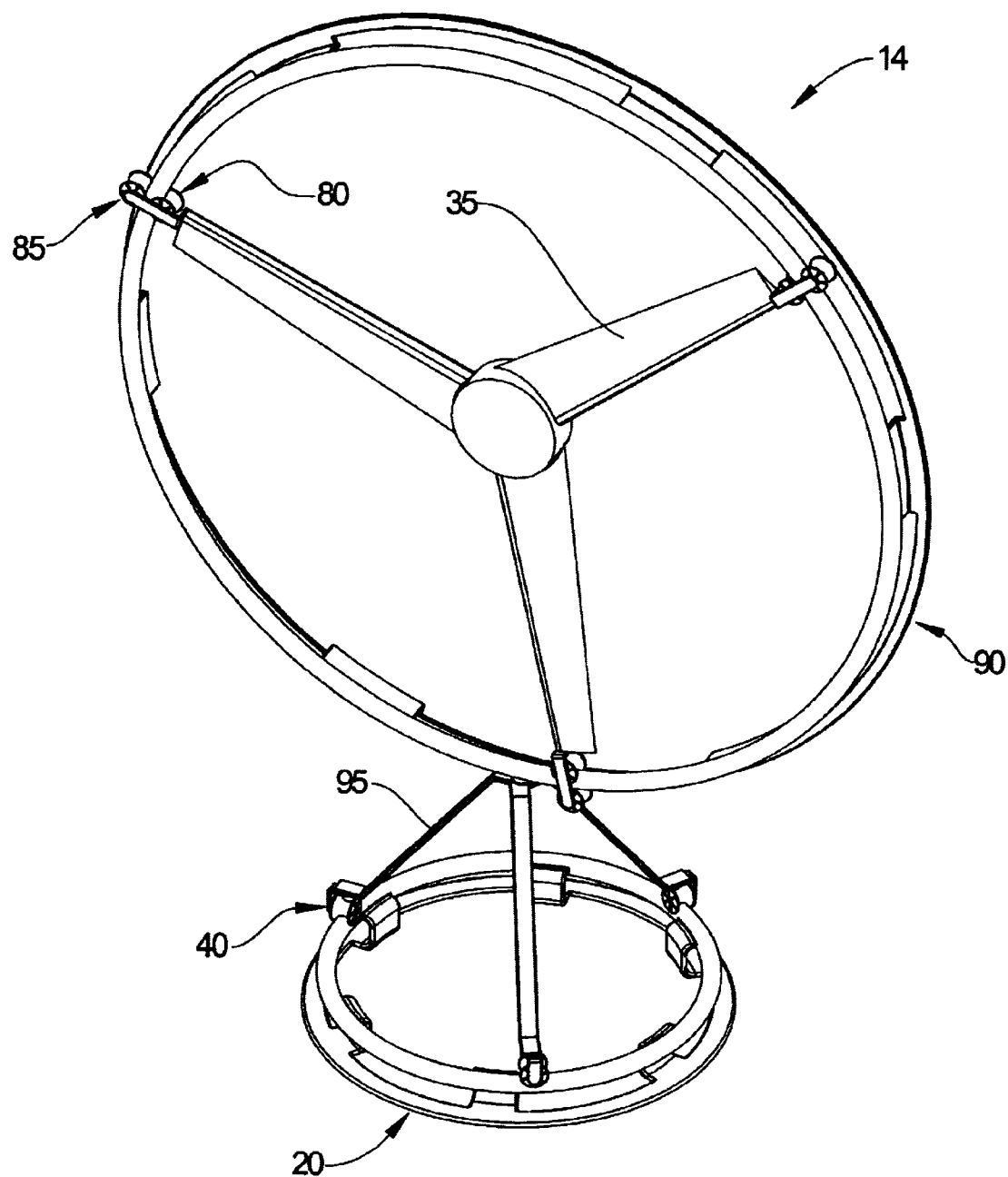
FIG. 4 is a perspective view of a fourth embodiment in accordance with the present invention.

FIG. 3 is a third embodiment of the present invention incorporated in a HAWT and generally denoted 13. Support ring 90 is orientated perpendicular to the windstream. Ring 90 provides support for blades 35 as they rotate. Inner rolling assembly 80 is fixed to the periphery of the blades and moves along the inside of ring 90. Ring 90 is supported by legs 95 that are coupled to rolling assembly 40. Rolling assembly 40 provides a yaw means for wind turbine 13 to adjust to the most efficient angle relative to the windstream. FIG. 4 shows a fourth embodiment of a HAWT generally denoted 14, and is similar to the third embodiment, but includes an outer rolling assembly 85.

Figure 5:
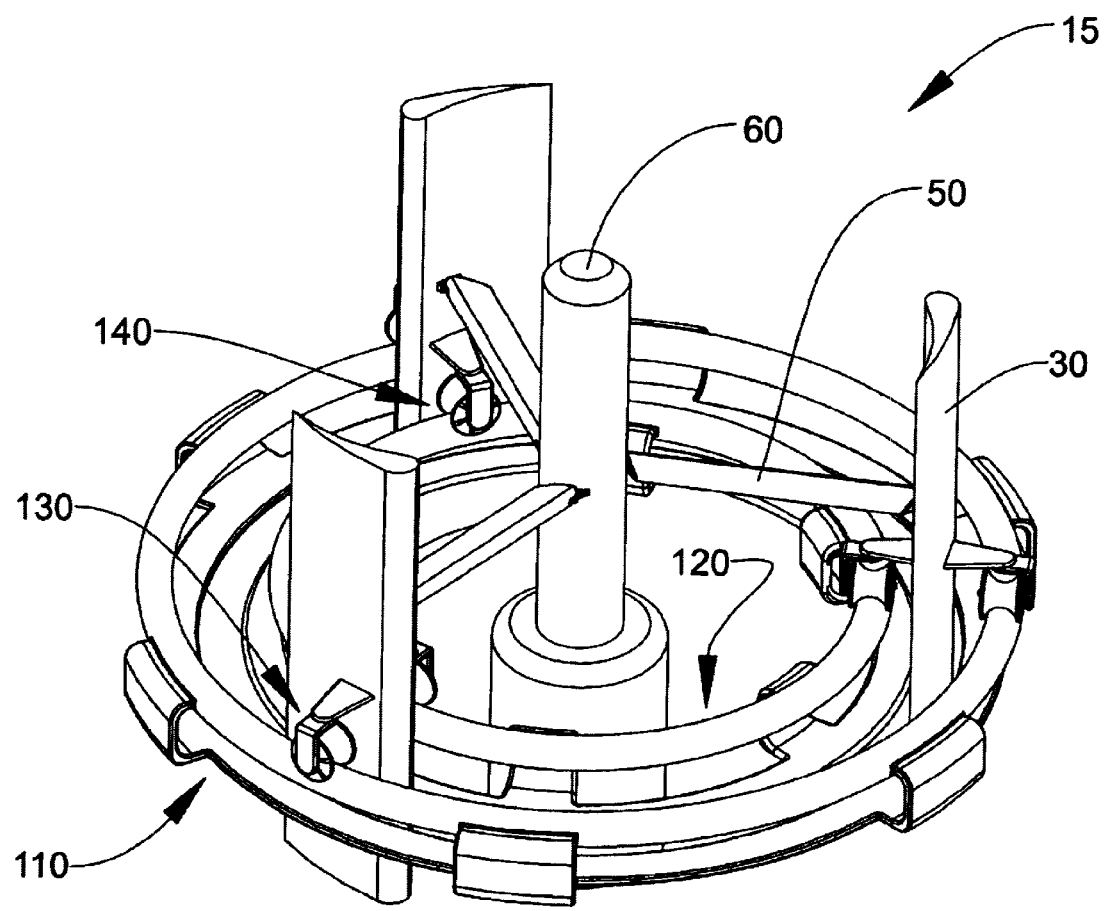
FIG. 5 is a perspective view of a fifth embodiment in accordance with the present invention.
Figure 6:
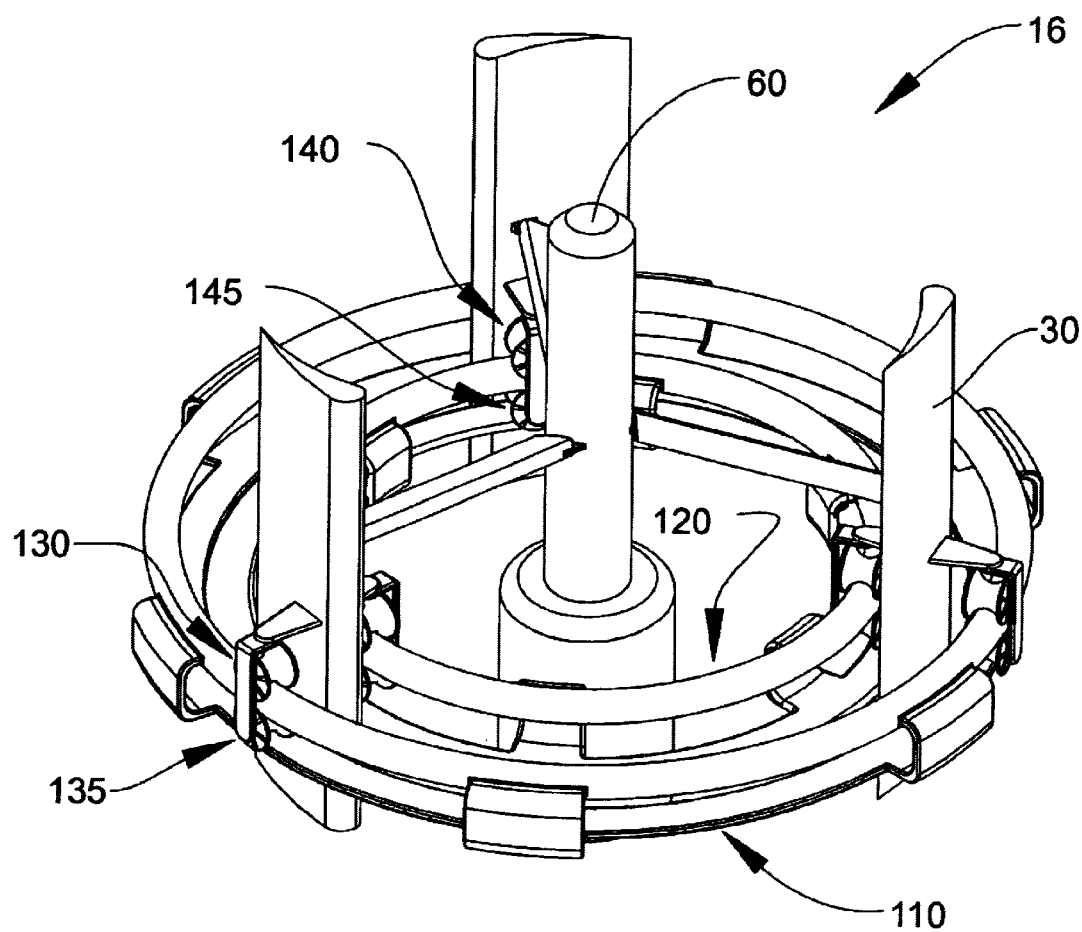
FIG. 6 is a perspective view of a sixth embodiment in accordance with the present invention.
Figure 7:
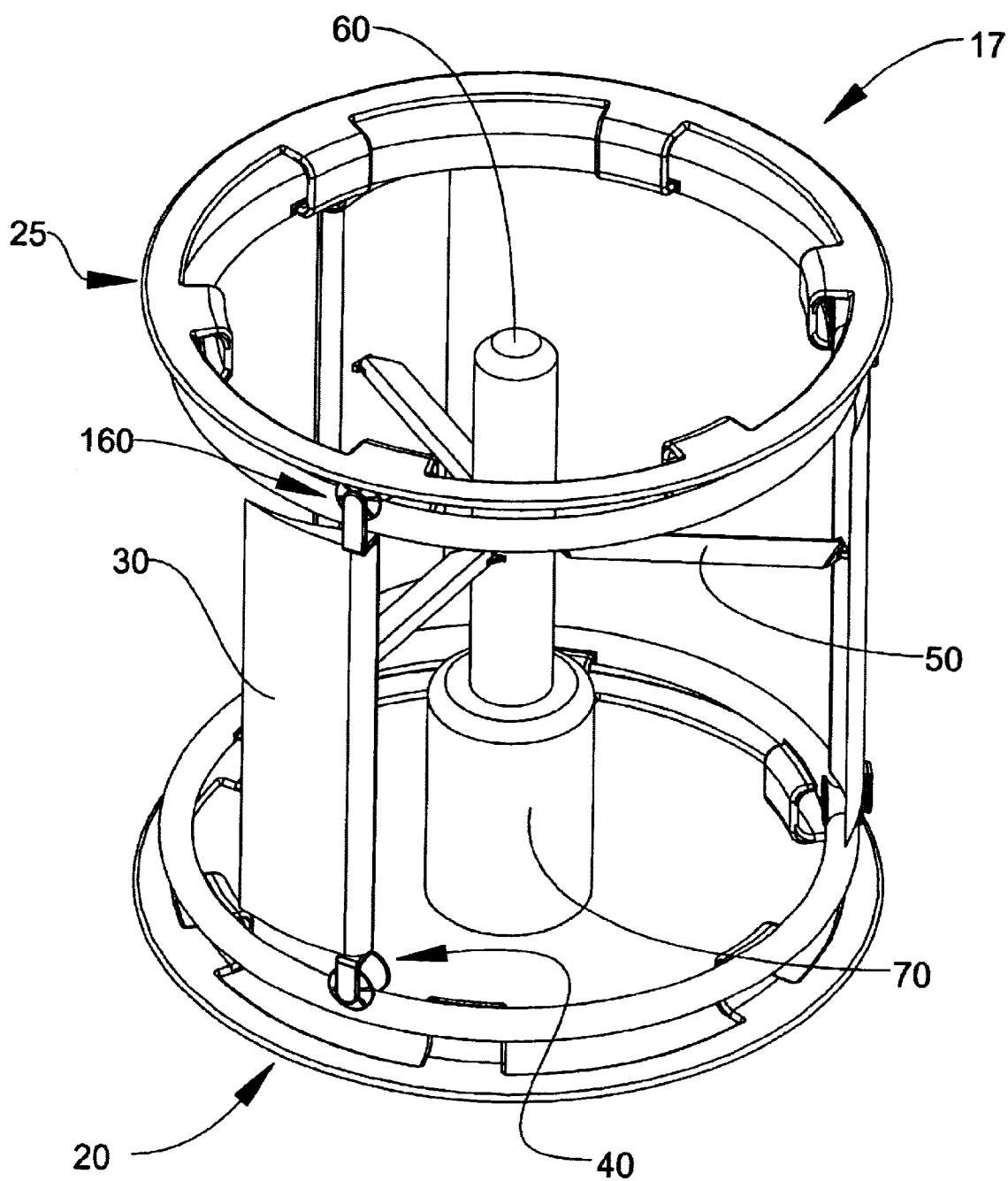
FIG. 7 is a perspective view of a seventh embodiment in accordance with the present invention.
Figure 8:
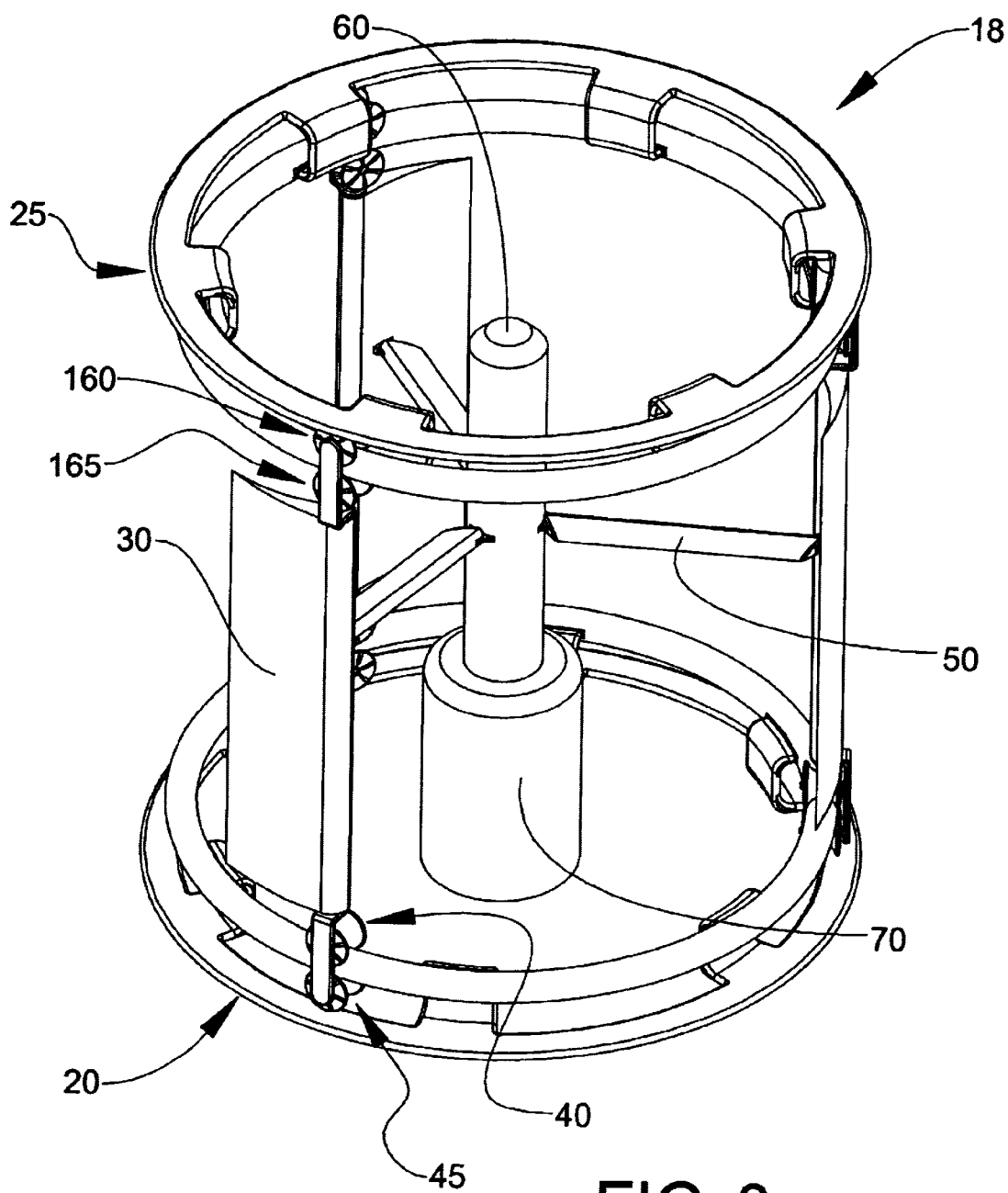
FIG. 8 is a perspective view of an eighth embodiment in accordance with the present invention.
Figure 9:
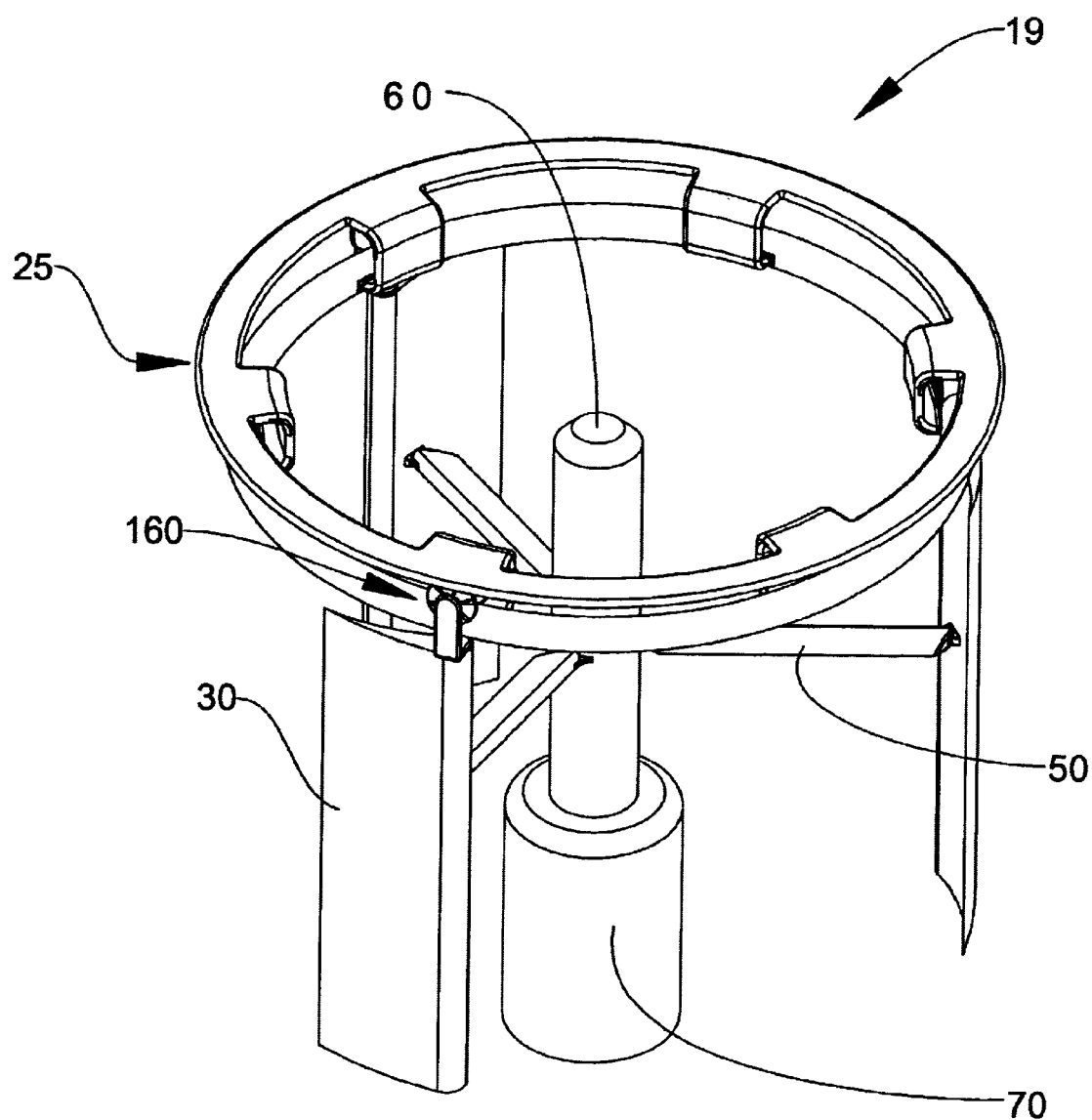
FIG. 9 is a perspective view of a ninth embodiment in accordance with the present invention.
Figure 10:
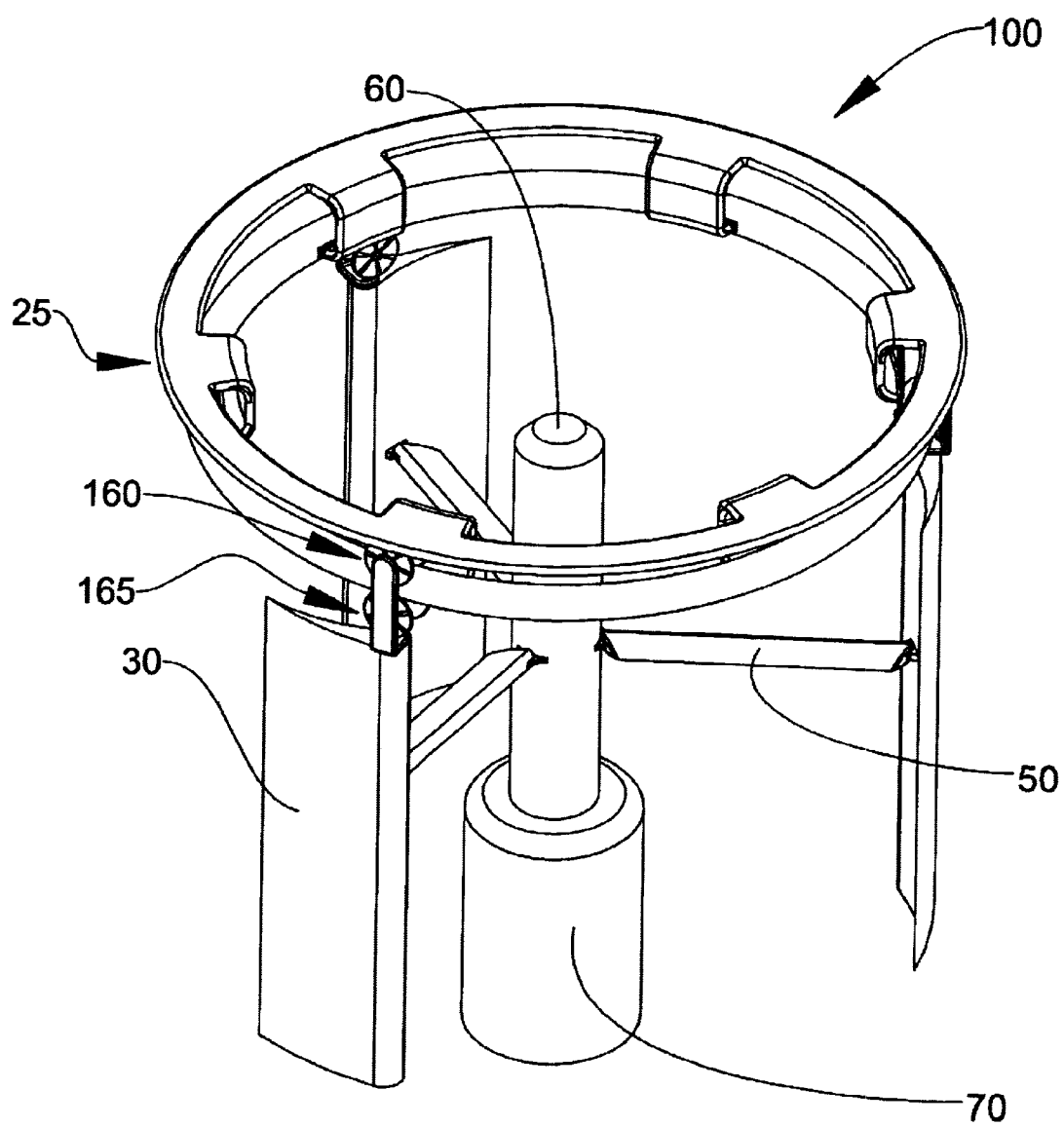
FIG. 10 is a perspective view of a tenth embodiment in accordance with the present invention.

FIG. 5 is a fourth embodiment of the present invention of a VAWT generally denoted 15. Rotor blades 30 are supported by external ring 110 and internal ring 120. Outer rolling assembly 130 is mounted to the outer periphery of blade 30 and inner rolling assembly 140 is mounted to the inner periphery of blade 30. The weight of blades 30 is distributed to both the inner 140 and outer 130 rolling assemblies and further to the respective inner 120 and outer 110 support rings. Radial arm 50 is provided to transfer the rotational energy to center shaft 60 and does not provide any significant load bearing capacity. FIG. 6 shows a sixth embodiment of a VAWT generally denoted 16, and is similar to the fifth embodiment, but includes additional lower rolling assemblies 135 and 145 to provide additional support of blades 30. FIG. 7 is a seventh embodiment of the invention and is generally denoted 17. Turbine 17 is similar to the first embodiment 10, but includes an upper support ring 25. An upper rolling assembly 160 is mounted to the uppermost end of blades 30 so that the blades are supported in a vertical manner both by the upper rolling assembly 160 and rolling assembly 40. FIG. 8 is an eighth embodiment generally denoted 18 and provides additional rolling assemblies 165 and 45. Rolling assemblies 165 and 45 are complementary rolling assemblies of 160 and 40, respectively. FIG. 9 is a ninth embodiment generally denoted 19 and provides only an upper support ring 25 from which blades 30 are suspended. Rolling assembly 160 is affixed to the uppermost end of blade 30 and is in cooperative supporting communication with ring 25. Rotational energy is provided to shaft 60 and generator 70 via radial arms 50. FIG. 10 is a tenth embodiment of a VAWT generally denoted 100, and is similar to the ninth embodiment, but includes an additional lower rolling assembly 165 to provide additional stabilization of blades 30.

Figure 11:
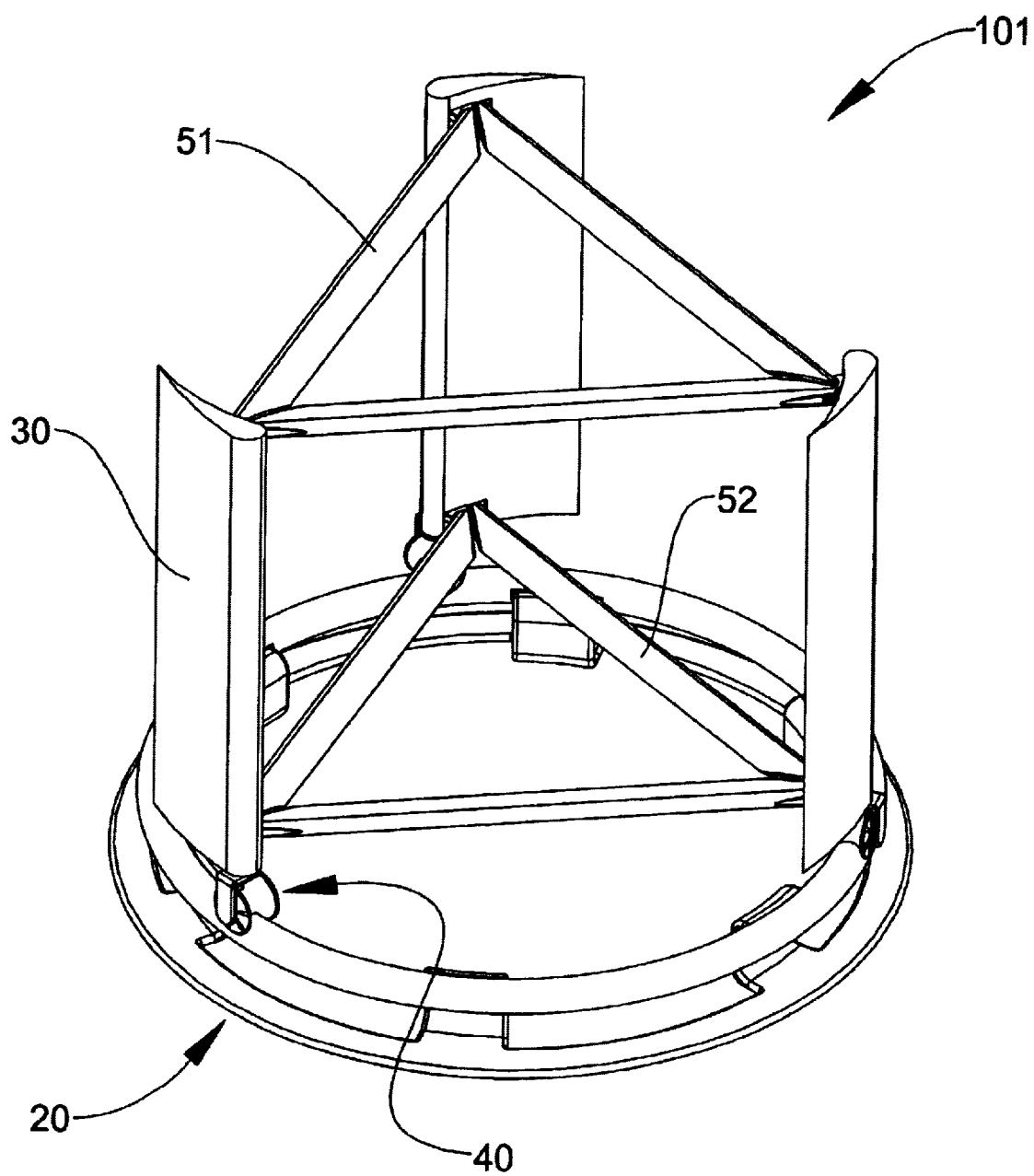
FIG. 11 is a perspective view of an eleventh embodiment in accordance with the present invention.
Figure 12:
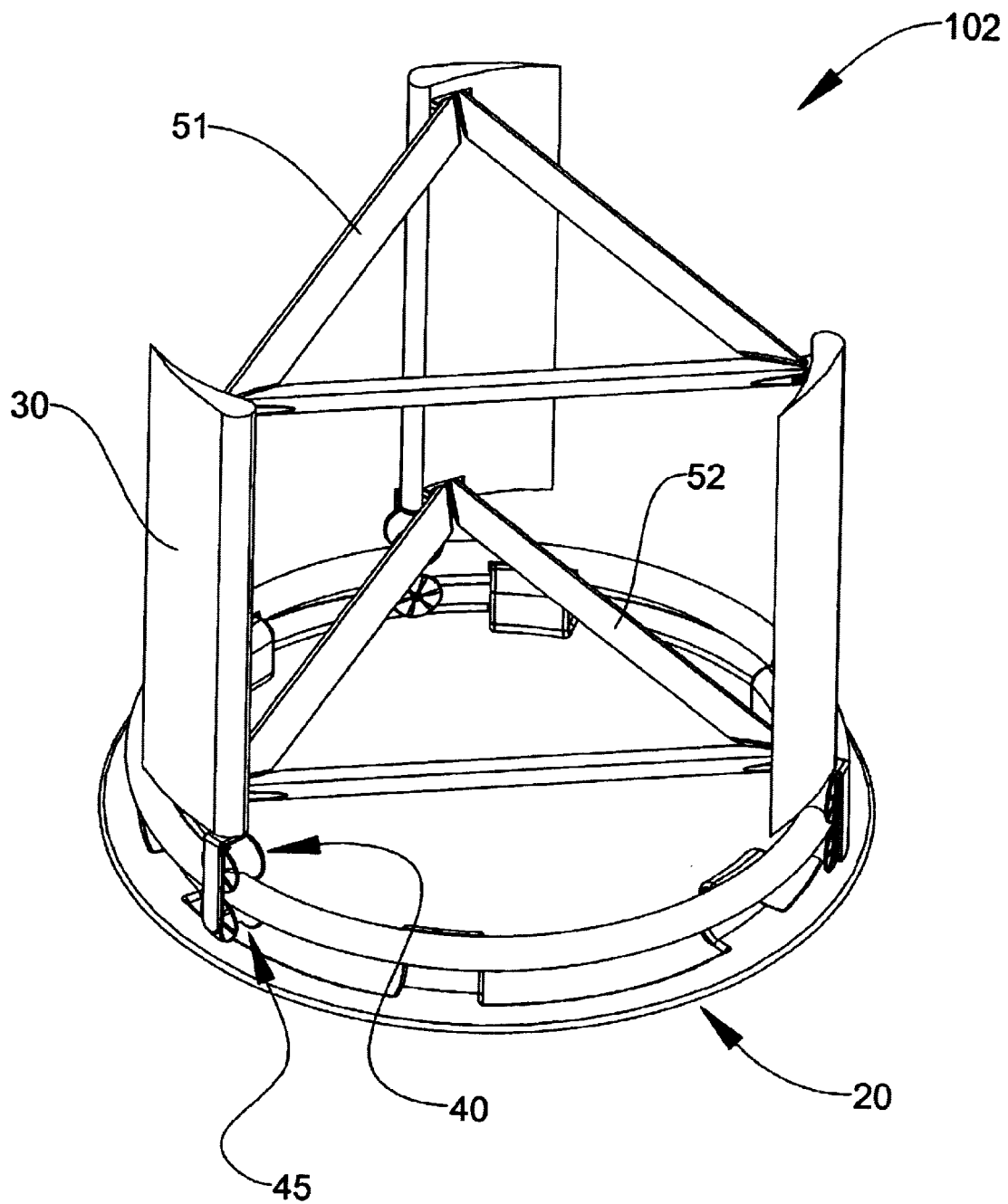
FIG. 12 is a perspective view of a twelfth embodiment in accordance with the present invention.

FIG. 11 shows an eleventh alternative embodiment of the invention generally denoted 101. No center shaft is provided for translating rotational energy into electricity, but a generator means (not shown) is provided within rolling assembly 40. Blades 30 are connected by struts 51 and 52 to provide a triangular configuration of blades 30. A lower rolling assembly 45 is shown in FIG. 12 in addition to upper rolling assembly 40.

Figure 13:
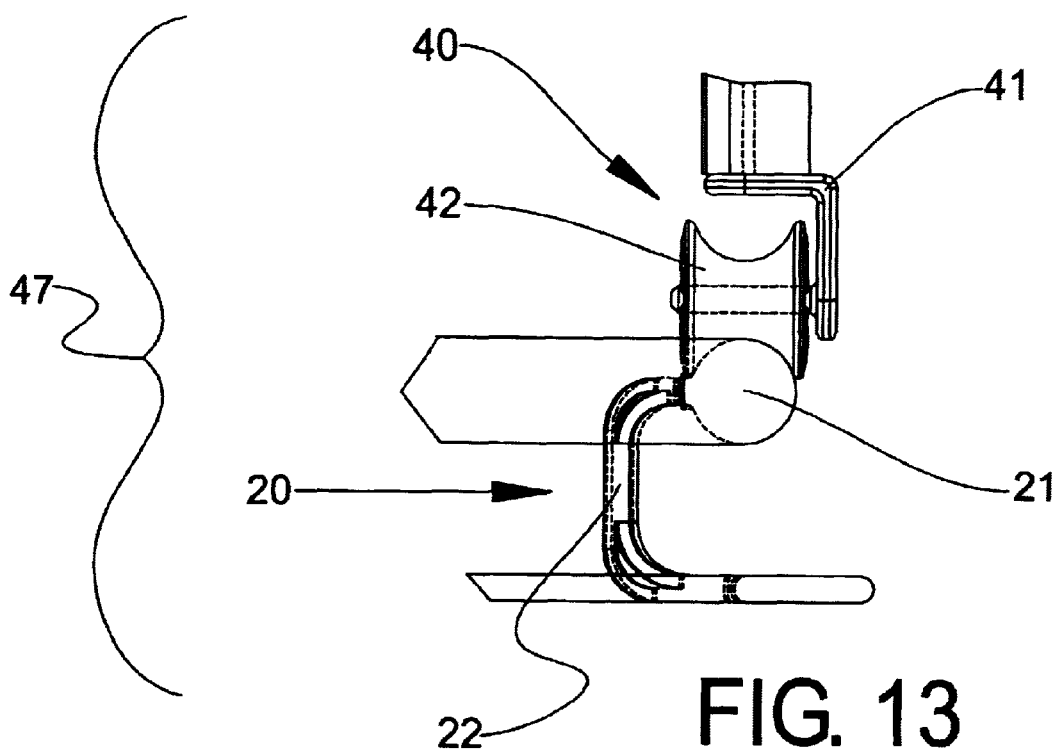
FIG. 13 is a partial side view of a support mechanism that shows a single rolling assembly in accordance with embodiments of the present invention.
Figure 14:
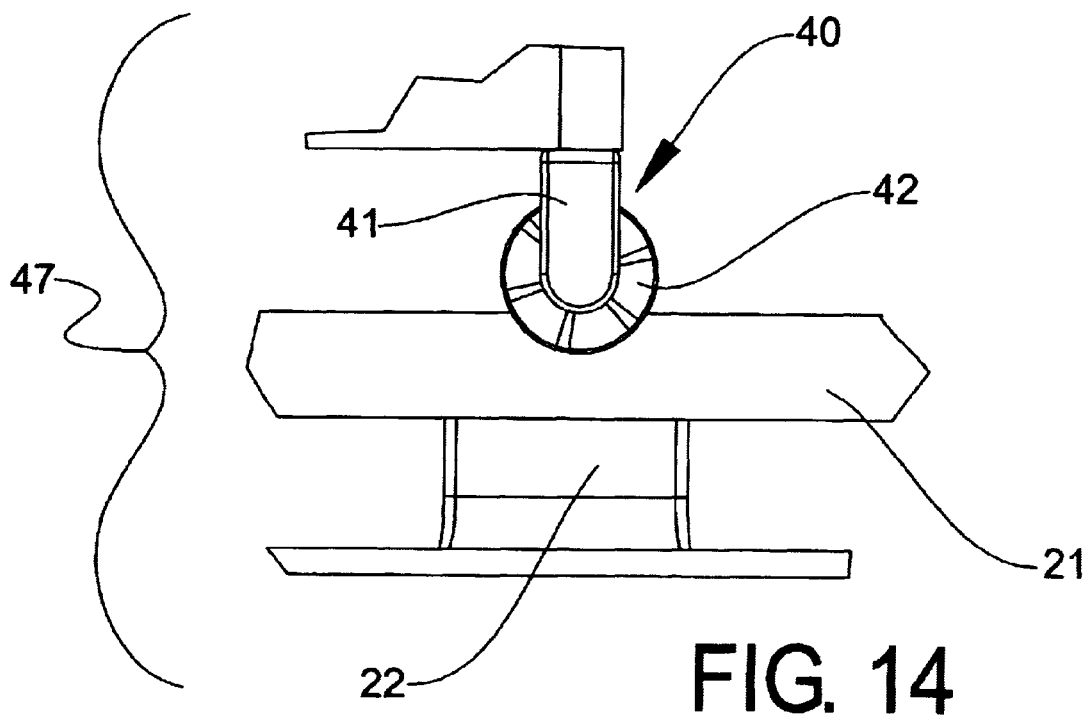
FIG. 14 is a partial front view of a support mechanism that shows a solitary rolling assembly in accordance with embodiments of the present invention.
Figure 15:
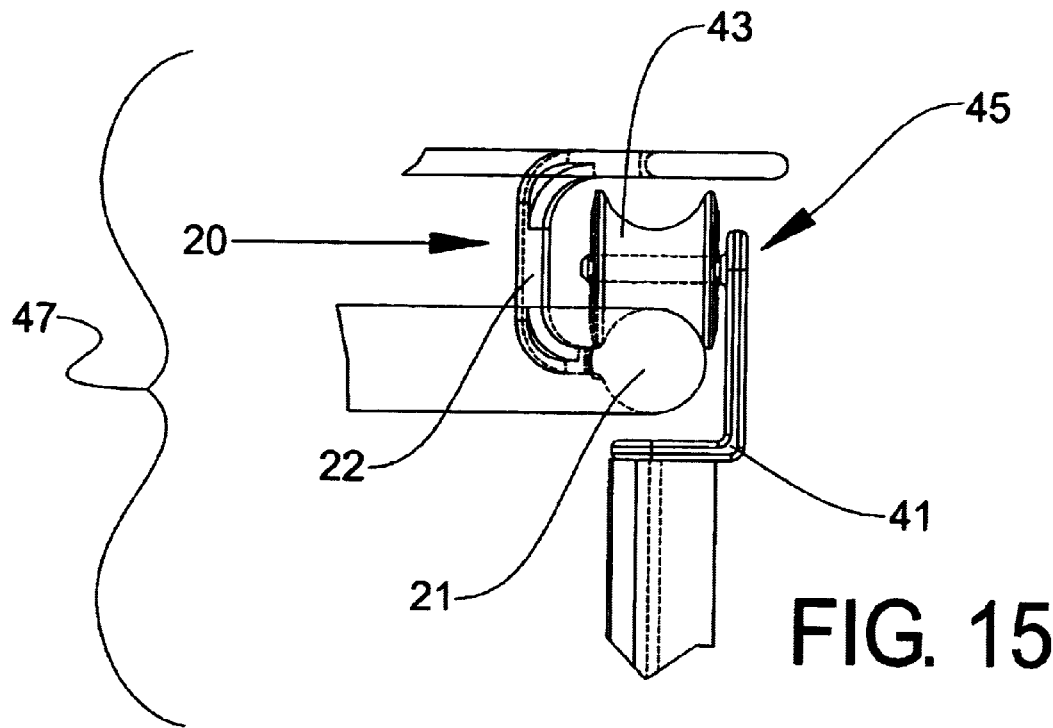
FIG. 15 is a partial side view of a support mechanism that shows a solitary rolling assembly in accordance with embodiments of the present invention.
Figure 16:
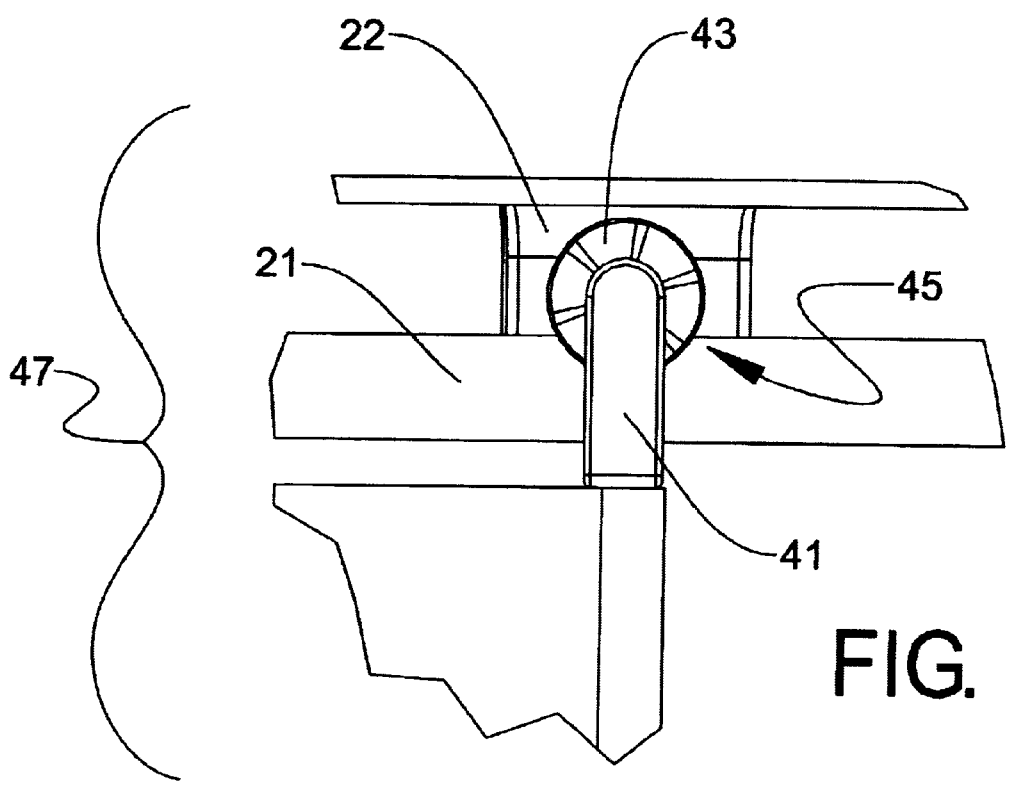
FIG. 16 is a partial front view of a support mechanism that shows a solitary rolling assembly in accordance with embodiments of the present invention.
Figure 17:
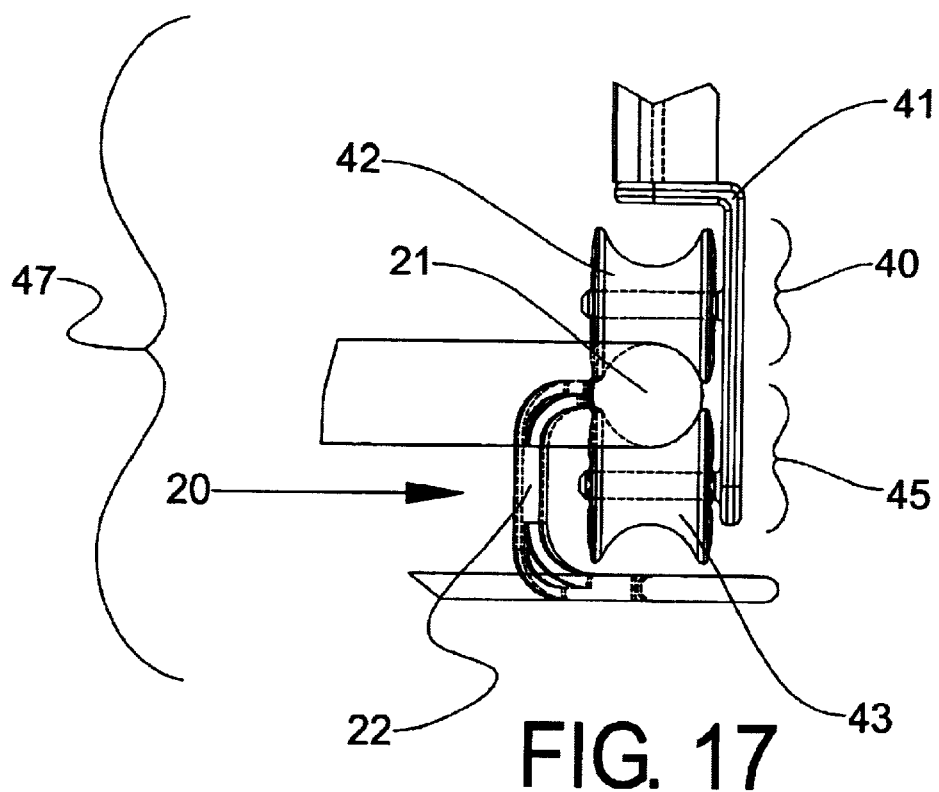
FIG. 17 is a partial side view of a support mechanism that shows cooperative rolling assemblies in accordance with embodiments of the present invention.
Figure 18:
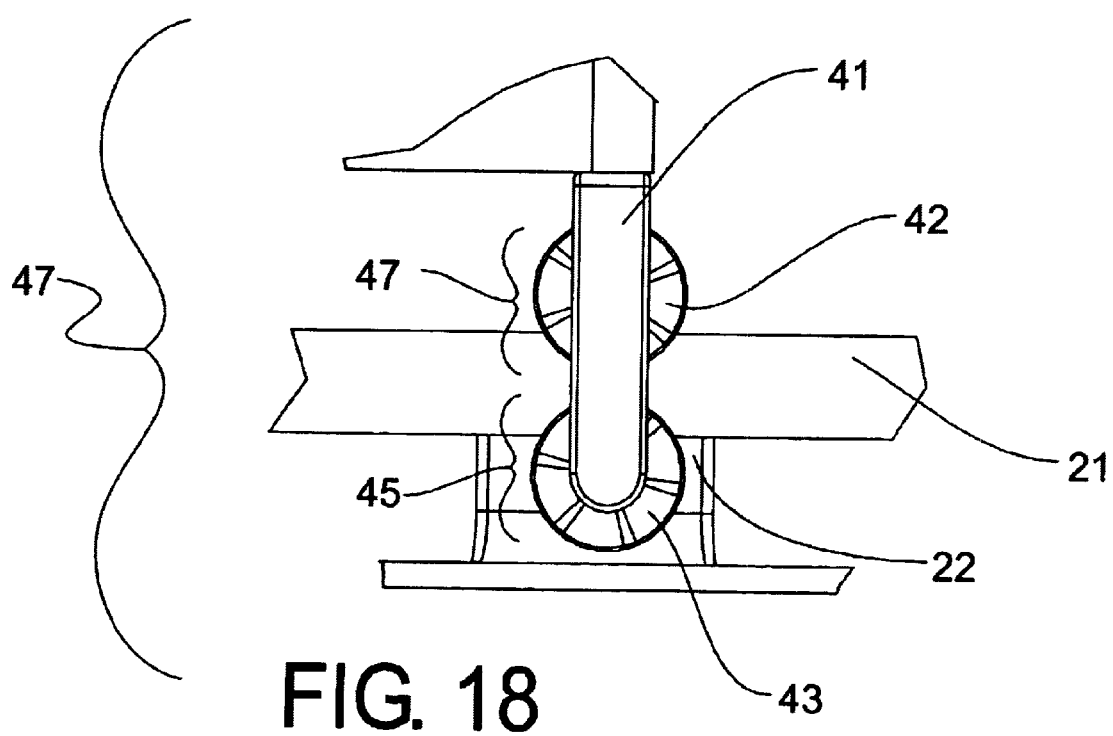
FIG. 18 is a partial front view of a support mechanism that shows cooperative rolling assemblies in accordance with embodiments of the present invention.

A detailed side view of upper rolling assembly 40 is shown in FIG. 13. Wheel 42 is cambered so that toric rail 21 provides a sufficient load transfer means for blades 30. Bracket 41 provides the connection between blades 30 and upper rolling assembly 40. Support frame 22 provides a means for rail 21 to maintain an appropriate orientation to upper rolling assembly 40. Support mechanism 47 includes all the elements of upper rolling assembly 40, but further includes those elements that comprise lower rolling assembly 45 as shown in FIGS. 17 and 18. FIG. 14 shows a detailed front view of upper rolling assembly 40. A detailed side view of lower rolling assembly 45 is shown in FIG. 15. Wheel 43 is cambered so that toric rail 21 provides a sufficient load transfer means for blades 30. Bracket 41 provides the connection between blades 30 and support mechanism 45. FIG. 16 shows a detailed front view of rolling assembly 45. FIG. 17 is a detailed side view of support mechanism 47 showing an upper rolling assembly 40 and lower rolling assembly 45 and FIG. 18 is a front view showing support mechanism 47. Support mechanism 47 in FIGS. 13–18 shows the support mechanism and rolling assemblies used in those embodiments that incorporate a lower support ring, however, FIGS. 13–18 are exemplary of the support mechanisms used in all the embodiments in cooperation with the respective support ring, e.g., upper, inner and outer rings.

It will be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention, which as a matter of language, might be said to fall therebetween.

Now that the invention has been described,
What is claimed is:

1. A peripheral turbine support system comprising:
   a rotor having a generally vertical axis of rotation;
   a plurality of blades distributed about the rotor, connected by a corresponding number of radial arms, and said blades defining a peripheral boundary of the rotor;
   said blades are shaped and angularly pitched across their width to the flow of air therebetween to effect rotation of said rotor;
   a support system for said blades including a support ring concentric with the vertical axis of rotation underlying the peripheral boundary of the rotor;
   said concentric support ring comprising lower, flattened concentric ring connected to an upper, rounded concentric ring through a plurality of metal bridges fused along said rings, thereby providing additional support;
   a support mechanism comprising a rolling assembly mounted at the base of said blades rotating above and in association with the upper surface of said rounded portion of the support ring so that the mass and force generated by said blades is substantially supported at the peripheral boundary of the rotor by said upper surface of the support ring.

2. The turbine of claim 1, wherein the support mechanism further comprises a lower rolling assembly in cooperative association and rotational supporting communication with the upper mounted rolling assembly and where the lower rolling assembly is situated between the flattened and rounded surface of the concentric rings so that the blades maintain rotational engagement with the support ring.

3. The turbine of claim 1, further comprising a vertical axis power take-off shaft located concentrically within the rotor from which the blades are radially connected.

4. The turbine of claim 1, further comprising a braking means associated with the support mechanism for halting rotation of the rotor when desired.

5. The turbine of claim 1 further comprising a braking means associated with the support mechanism for halting rotation of the rotor when desired.

6. The turbine of claim 1 further comprising:
   an upper support ring concentric with the vertical axis of rotation and adjacent to an upper peripheral boundary of the rotor located opposite and parallel to the lower support ring;
   an upper support mechanism for each blade comprising a lower support mechanism mounted in rotational supporting association with the upper support ring so that the forces generated by each blade is cooperatively supported at the peripheral boundary of the rotor by a lower surface of the upper support ring and the upper surface of the lower support ring.

7. The turbine of claim 6, wherein the lower support mechanism comprises a lower rolling assembly in cooperative association with the upper rolling assembly, the lower rolling assembly is provided in rotational supporting communication with a lower surface of the lower support ring so that the blades maintain rotational engagement with the lower support ring.

8. The turbine of claim 7, wherein the upper support mechanism further comprises an upper rolling assembly in cooperative association with the lower rolling assembly, the upper rolling assembly is provided in rotational supporting communication with an engagement wit the upper support ring.

9. The turbine of claim 6 further comprising a vertical axis power take-off shafted located concentrically within the rotor from which the blades are radially connected.

10. The turbine of claim 6 further comprising a braking means associated with the support mechanism for halting rotation of the rotor when desired.

11. A peripheral turbine support system comprising:
   a rotor having a generally horizontal axis of rotation;
   a plurality of blades distributed about the rotor, connected by a corresponding number of radial arms, and said blades defining a peripheral boundary of the rotor;
   said blades are shaped and angularly pitched across their width to the flow of air therebetween to effect rotation of said rotor and where the blades are perpendicular to the horizontal axis of the rotor and the wind-stream;
   a support system for said plurality of blades including a support ring concentric with the horizontal axis of rotation and adjacent to the peripheral boundary of the rotor;
   said concentric support ring comprising of a flattened concentric ring connected to a rounded concentric ring through a plurality of metal bridges fused along said rings, thereby providing additional support;
   a support mechanism comprising a rolling assembly mounted at the base of said blades rotating above and in association with the surface of the support ring proximal to the rotor, so that the mass and force generated by said blades is substantially supported at the peripheral boundary of the rotor by said proximal surface;

said support ring buttressed by a plurality of legs in triangular design where said support ring is mounted at the apex and a rolling assembly is mounted at the base of each leg;

a second concentric support ring comprising of a lower, flattened concentric ring connected to an upper, rounded concentric ring through a plurality of metal bridges fused along said second support ring, thereby providing additional support;

said rolling assembly at the base of said legs rotate above and in association with the upper surface of said rounded portion of second support ring providing a yaw means to adjust the angel with respect to the windstream.

12. The turbine of claim 11, wherein the support mechanism for the plurality of blades further comprises a second rolling assembly in cooperative association and rotational supporting communication with said first rolling assembly and where the second rolling assembly rotates above and in association with the surface of the support ring distal to the rotor so that the blades maintain rotational engagement with the support ring.

13. The turbine of claim 11 further comprising a horizontal axis power take-off shaft located concentrically within the rotor from which the rotor blades are radially connected.

14. The turbine of claim 11 further comprising a braking means associated with the support mechanism for halting rotation of the rotor when desired.

15. A peripheral turbine support system comprising:

a rotor having a generally vertical axis of rotation;

a plurality of blades distributed about the rotor, connected by a corresponding number of radial arms, and said blades defining a peripheral boundary of the rotor;

said blades are shaped and angularly pitched across their width to the flow of air therebetween to effect rotation of said rotor;

a support system for the blades including outer and inner blade support rings concentric with the vertical axis of rotation and adjacent to the outer and inner peripheral boundary of the rotor, respectively, the support rings interposed substantially equidistant along the length of the blades;

said inner and outer support mechanism comprising a lower, flattened concentric ring connected to an upper, rounded concentric ring through a plurality of metal bridges fused said rings, respectively, thereby providing additional support;

said outer support mechanism for each blade comprising a rolling assembly mounted substantially equidistant along the length of each blade base in rotational supporting association with the outer support ring so that each blade is supported at the outer peripheral boundary of the rotor by an upper surface of the outer support ring;

said inner support mechanism for each blade comprising a rolling assembly mounted substantially equidistant along the length of each blade base in rotational supporting association with the inner support ring so that each blade is supported at the inner peripheral boundary of the rotor by an upper surface of the inner support rings.

16. The turbine of claim 15, wherein each respective support mechanism further comprises a lower rolling assembly in cooperative association and rotational supporting communication with the upper mounted rolling assembly, where the lower rolling assembly is situated between the flattened and rounded surface of the respective concentric rings so that the blades maintain rotational engagement with the inner and outer support ring.

17. The turbine of claim 15 further comprising a vertical axis power take-off shaft located concentrically within the rotor from which the blades are radially connected.

18. A peripheral turbine support system comprising;

a rotor having a generally vertical axis of rotation;

a plurality of blades distributed about the rotor, connected by a corresponding number of radial arms, and said blades defining a peripheral boundary of the rotor;

said blades are shaped and angularly pitched across their width to the flow of air therebetween to effect rotation of said rotor;

a support system for said blades including an upper support ring concentric with the vertical axis of rotation and adjacent to the substantially uppermost peripheral boundary of the rotor;

said concentric upper support ring comprising of a flattened concentric ring connected to a rounded concentric ring through a plurality of metal bridges fused along said rings, thereby providing additional support;

a support mechanism for each blade located at the substantially uppermost portion of said blade comprising a rolling assembly mounted in rotational supporting association with the rounded surface of the support ring so that the mass and force generated by said blades is substantially supported at the peripheral boundary of the rotor by said said round surface of the upper support ring.

19. The turbine of claim 18 further comprising a vertical axis power take-off shaft located concentrically within the rotor from which the blades are radially connected.

20. The turbine of claim 18 further comprising a braking means associated with the support mechanism for halting rotation of the rotor when desired.

* * * * *